US012033040B2

(12) United States Patent
Muffat

(10) Patent No.: US 12,033,040 B2
(45) Date of Patent: Jul. 9, 2024

(54) METHOD, MACHINE LEARNING ENGINES AND FILE MANAGEMENT PLATFORM SYSTEMS FOR CONTENT AND CONTEXT AWARE DATA CLASSIFICATION AND SECURITY ANOMALY DETECTION

(71) Applicant: Dathena Science Pte. Ltd., Singapore (SG)

(72) Inventor: Christopher Muffat, Singapore (SG)

(73) Assignee: Dathena Science Ptd. Ltd., Singapore (SG)

( * ) Notice: Subject to any disclaimer, the term of this patent is extended or adjusted under 35 U.S.C. 154(b) by 525 days.

(21) Appl. No.: 17/268,381

(22) PCT Filed: Aug. 14, 2018

(86) PCT No.: PCT/SG2018/050411
§ 371 (c)(1),
(2) Date: Feb. 12, 2021

(87) PCT Pub. No.: WO2019/035765
PCT Pub. Date: Feb. 21, 2019

(65) Prior Publication Data
US 2021/0319179 A1 Oct. 14, 2021

(51) Int. Cl.
*G06N 20/00* (2019.01)
*G06F 18/23213* (2023.01)
(Continued)

(52) U.S. Cl.
CPC ....... *G06N 20/00* (2019.01); *G06F 18/23213* (2023.01); *G06F 40/284* (2020.01); *G06F 40/30* (2020.01)

(58) Field of Classification Search
CPC . G06N 20/00; G06F 18/23213; G06F 40/284; G06F 40/30; G06F 16/355; G06F 21/6245; G06F 40/216
See application file for complete search history.

(56) References Cited

U.S. PATENT DOCUMENTS 10,210,244 B1 * 2/2019 Branavan ................ G06F 16/35
2004/0139067 A1 7/2004 Houle
(Continued)

FOREIGN PATENT DOCUMENTS

CN 106897459 A 6/2017

OTHER PUBLICATIONS

International Search Report for international application No. PCT/SG2018/050411, dated Sep. 11, 2018, 5p.
(Continued)

*Primary Examiner* — Abul K Azad
(74) *Attorney, Agent, or Firm* — Crowell & Moring LLP

(57) ABSTRACT

Systems, methods and computer readable medium are provided for perform a method for content and context aware data classification or a method for content and context aware data security anomaly detection. The method for content and context aware data confidentiality classification includes scanning one or more documents in one or more network data repositories of a computer network and extracting content features and context features of the one or more documents into one or more term frequency-inverse document frequency (TF-IDF) vectors and one or more latent semantic indexing (LSI) vectors. The method further includes classifying the one or more documents into a number of category classifications by machine learning the extracted content features and context features of the one or more documents at a file management platform of the computer network, each of the category classifications being associated with one or more confidentiality classifications.

13 Claims, 7 Drawing Sheets

(51) Int. Cl.
*G06F 40/284* (2020.01)
*G06F 40/30* (2020.01)

(56) References Cited

U.S. PATENT DOCUMENTS

| | | | |
|---|---|---|---|
| 2011/0137921 A1* | 6/2011 | Inagaki | G06F 16/3347 |
| | | | 707/E17.061 |
| 2013/0104251 A1 | 4/2013 | Moore et al. | |
| 2014/0201111 A1* | 7/2014 | Kasravi | G06N 3/084 |
| | | | 706/12 |
| 2015/0254469 A1 | 10/2015 | Butler | |
| 2016/0078507 A1* | 3/2016 | Shivaswamy | G06Q 30/0629 |
| | | | 705/26.2 |
| 2016/0352772 A1* | 12/2016 | O'Connor | H04L 63/1483 |
| 2018/0095652 A1* | 4/2018 | Branch | G08B 25/008 |
| 2018/0107838 A1 | 4/2018 | Amarendran et al. | |
| 2018/0300315 A1* | 10/2018 | Leal | G06F 40/268 |
| 2020/0035229 A1* | 1/2020 | Solanki | G10L 15/26 |

OTHER PUBLICATIONS

Written opinion of the International Searching Authority for international application No. PCT/SG2018/050411 dated Nov. 1, 2018, 8p.

* cited by examiner

DOCMETA

+ key: Document hash

Information
+ remotePath: Path in the drive
+ size: Document size
+ has_exception: "true" or "false"
+ docType: Document type (Excel, Word, ...)
+ encrypted: "true" "false"
+ fileName: last part of the remotePath
+ has_datatypes: list of datatypes with .
+ hash: file's content sha256 hash
+ is_train: 0 or 1
+ language: short language name
+ lastModified: date of last modification
+ lastModifier: username of the last modifier
+ owner: username of the owner
+ owner_nts: username of the NTFS owner -
+ section_index: section index (DEPRECATED)

Classification
+ proposedCategory: Category from clustering
+ reviewedCategory: Category from user review
+ predictedCategory: Category from classification
+ validatedCategory: Category from user validation + proposedConfidentiality: Confidentiality from clustering
+ reviewedConfidentiality: Confidentiality from user review
+ predictedConfidentiality: Confidentiality from classification
+ validatedConfidentiality: Confidentiality from user validation + cluster_id
+ distance: Distance to centroid (cluster)
+ accuracy: Accuracy of the proposition

Fig. 1B

| Table BOW |
| Row key: hashed file content (binary) |
| Column family 0 |
| size (int) |
| indices (int array) |
| values (double array) |
| label (int) |

Fig. 1D

METHOD, MACHINE LEARNING ENGINES AND FILE MANAGEMENT PLATFORM SYSTEMS FOR CONTENT AND CONTEXT AWARE DATA CLASSIFICATION AND SECURITY ANOMALY DETECTION

RELATED APPLICATION

The present application is a national phase application of PCT Application No. PCT/SG2018/050411, filed Aug. 14, 2018. The entirety of the above application is hereby incorporated by reference.

TECHNICAL FIELD

The present invention generally relates to document management, and more particularly relates to methods, machine learning engines and file management platform system for content and context aware data classification and security anomaly detection.

BACKGROUND OF THE DISCLOSURE

Information is one of the most important assets in any industry. With more and more cyber-attacks and data breach stories appearing in the media, organizations become aware of the importance of data confidentiality management. Further, to protect sensitive data, and to meet regulatory requirements imposed by different jurisdictions, more and more organizations' electronic documents and e-mails ("unstructured data") need to be monitored, categorised, and classified internally.

For example, an organization's valuable and proprietary information may include documents of different formats and different topics that need confidentiality management, such as financial and transaction reports, research's scope, approach and results, product specifications, customer, client or patient data, and/or confidential e-mail messages.

"Data Loss Prevention" (DLP) is a preventative or reactive mechanism for identifying data that is being or has been compromised. DLP solutions have become the control suite of choice for protecting information assets, and the implementation of DLP solutions have taken many shapes and forms, driven by organizational and budgetary requirements. However, simply implementing email monitoring and endpoint security solution does not ensure ongoing data security. Indeed, DLP solutions require ongoing manual data confidentiality classification, configuration tuning and management to react and adapt to an ever-changing threat landscape.

Regardless of the size or shape of organization's information security control suite, another drawback of the existing DLP solutions is that the accuracy of automatic confidentiality classification of unstructured data depends largely on the amount of "labelled data" (e.g. documents having assigned a level of confidentiality) using supervised machine learning methods. However, the problem of insufficient labelled data due to the large amount of time and labour required for manual data confidentiality classification is an ongoing challenge, since there is always a substantial volume of unlabelled data.

Thus, what is needed is a method and system for document confidentiality classification that overcomes the above drawbacks. Furthermore, other desirable features and characteristics will become apparent from the subsequent detailed description and the appended claims, taken in conjunction with the accompanying drawings and this background of the disclosure.

SUMMARY

According to an aspect of the present invention, a method for content and context aware data confidentiality classification is provided. The method includes scanning one or more documents in one or more network data repositories of a computer network and extracting content features and context features of the one or more documents into one or more term frequency-inverse document frequency (TF-IDF) vectors and one or more latent semantic indexing (LSI) vectors. The method further includes classifying the one or more documents into a number of category classifications by machine learning the extracted content features and context features of the one or more documents at a file management platform of the computer network, each of the category classifications being associated with one or more confidentiality classifications.

According to another aspect of the present invention, a method for content and context aware data classification is provided. The method includes identifying an unstructured document in a network data repository of a computer network, scanning content data and metadata of the unstructured document, and extracting content features and context features of the unstructured document based on the content data and metadata. The method further includes converting the content features and context features into term frequency-inverse document frequency (TF-IDF) vectors, by Latent Semantic Indexing (LSI), transforming the TF-IDF vectors to LSI vectors to reduce dimensionality, and predicting one or more category classifications for the document by machine learning the extracted content features and context features of the unstructured document at a file management platform of the computer network in response to the LSI vectors, wherein each of the category classifications is associated with one or more confidentiality classifications.

According to a further aspect of the present invention, a method for content and context aware data security anomaly detection is provided. The method includes machine learning content and context data of one or more documents in one or more network data repositories of a computer network to determine category classification and/or confidentiality classification for each of the one or more documents. The method also includes receiving a request from a user to access one of the one or more documents stored in one of the one or more network data repositories, the request including content or context data of the document and identifying a confidentiality classification of the document in response to the machine learning. Finally, the method includes determining a security access control level of the user based on lightweight directory access protocol (LDAP) extraction and detecting a data security anomaly if the security access control level of the user is lower than the confidentiality classification of the document.

According to another aspect of the present invention, a machine learning engine for content and context aware data classification is provided. The machine learning engine includes a model training module, a model evaluation module and a data classification engine. The model training module is configured to predict one or more clustering models based on machine learning latent semantic indexing (LSI) vectors of the documents in the raw training set, each clustering model clustering one or more of the LSI vectors into a number of category classifications, each of the category classifications being associated with one or more confidentiality classifications. The model training module is also configured to select a clustering model from the one or more clustering models based on a confirmation of its corresponding category classifications by an administrator of a computer network. The model evaluation module is configured to evaluate the selected clustering model by applying the selected clustering model to cluster the documents in the raw test set. And the data classification engine is configured to classify all of the one or more documents into the number of category classifications using the selected clustering model if the evaluation of the selected clustering model produces same category classifications as the labels of the raw test set and to indicate to the feature clustering module to select another clustering model from the one or more clustering models if the evaluation of the selected clustering model produces different category classifications from the labels of the raw test set.

According to another aspect of the present invention, a file management platform system for content and context aware data classification is provided. The file management platform system includes a feature engineering module and a machine learning engine. The feature engineering module is configured to split one or more documents in one or more network data repositories of a computer network into a labeled set and an unlabeled set, wherein the labeled set is randomly split into a raw labeled training set and a raw test set based on a predetermined ratio, wherein the unlabeled set is merged with the raw labelled training set to form a raw training set. The feature engineering module is further configured to extract the content features and context features of the documents in the raw training set, vectorize the content features and the context features of the documents in the raw training set into one or more bag-of-words (BOW) representations, convert the one or more bag-of-words (BOW) representations of the documents in the raw training set respectively into one or more term frequency-inverse document frequency (TF-IDF) vectors, and project the one or more TF-IDF vectors of the documents in the raw training set into a latent semantic indexing (LSI) space based on a desired level of retained variance to transform the one or more TF-IDF vectors to one or more LSI vectors. The machine learning engine includes a model training module, a model evaluation module and a data classification engine. The model training module is configured to predict one or more clustering models based on machine learning the one or more LSIF vectors of the documents in the raw training set, each clustering model clustering the one or more LSI vectors into a number of category classifications, each of the category classifications being associated with one or more confidentiality classifications. The model training module is also configured to select a clustering model from the one or more clustering models based on a confirmation of its corresponding category classifications by an administrator of the computer network. The model evaluation module is configured to evaluate the selected clustering model by applying the selected clustering model to cluster the documents in the raw test set. And the data classification engine is configured to classify all of the one or more documents into the number of category classifications using the selected clustering model if the evaluation of the selected clustering model produces same category classifications as the labels of the raw test set and to indicate to the feature clustering module to select another clustering model from the one or more clustering models if the evaluation of the selected clustering model produces different category classifications from the labels of the raw test set.

According to other aspects of the present invention, a computer readable medium for content and context aware data confidentiality classification and security anomaly detection or is provided. The computer readable medium includes instructions which, when executed by a processor, make the processor perform a method for content and context aware data classification or a method for content and context aware data security anomaly detection in accordance with any of the respective methods described herein.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 1, comprising FIGS. 1A to 1D, depicts an illustration of a file management platform system in accordance with a present embodiment, wherein FIG. 1A depicts a schematic diagram of a file management platform system in which a method for content and context aware data confidentiality classification is implemented in accordance with an example of the present application and FIGS. 1B to 1D depict examples of three interlinked tables stored in a database of the file management platform system of FIG. 1A.

Figure 1A:
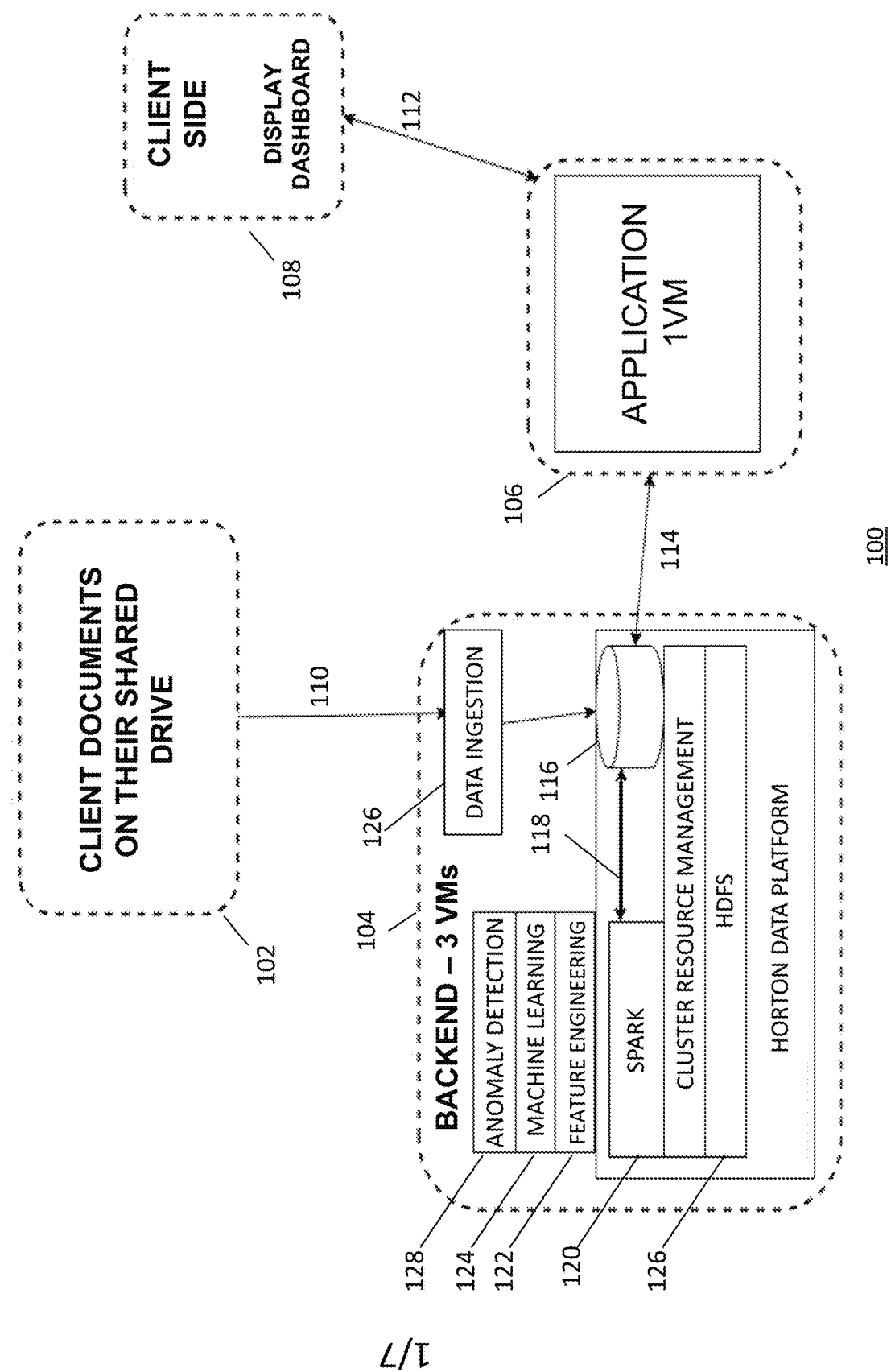

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Some embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "extracting", "classifying", "recognizing", "splitting", "removing", "transforming", "retaining", "vectorizing", "converting", "projecting", "storing", "clustering", "merging", "predicting", "selecting", "evaluating", "validating" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

Embodiments of the present application presents methods, machine learning enginea and file management platform systems for content and context aware data classification and/or content and context aware data security anomaly detection, which produce predictions of information confidentiality level (which may be interchangeably referred to as "confidentiality classification" in the present specification) for each of documents stored in data repositories/shared drives of a computer network of an organization (e.g. a company, a university, or any kinds of establishment). The predictions are based on features extracted from content and metadata of the documents. The systems also provide a User Interface, utilizing the metadata of the documents, for users (e.g. employees of a company) to trace records and validate predictions.

In the present application, the methods for content and context aware data classification are based on hybrid machine learning which adopts unsupervised learning, supervised learning and graph-based semi-supervised learning algorithms (i.e. label propagation algorithms).

As used in the present specification, the term "unsupervised learning" refers broadly to a machine learning task of inferring a function that describes a structure or pattern of "unlabeled" data (i.e. data that has not been classified or categorized). It is sometimes referred to as knowledge discovery. Since the examples given to unsupervised learning algorithms are unlabeled, there is no straightforward way to evaluate the accuracy of the structure that is produced by the unsupervised learning algorithms.

One type of unsupervised learning algorithm is "clustering", which groups a set of objects in such a way that objects in the same group (called a cluster) are more similar (in some sense) to each other than to those in other groups (clusters). That is, pairwise dissimilarities between objects assigned to the same cluster tend to be smaller than those in different clusters 1. In the methods of the present application, diverse types of clustering algorithms are used to discover groups of similar documents based on their vector space representation. Each cluster represents a category.

As used in the present specification, the term "supervised learning" refers broadly to a machine learning task of inferring a function from a labeled training set. The training set consists of a number of training examples. In supervised learning, each example in the training set consists of an input object such as a vector and a desired output value. A supervised learning algorithm analyzes the training set and produces an inferred function, which can be a classification if the output is discrete or a regression function if the output is continuous. The inferred function predicts the correct output value for any valid input object such as a file vector.

As used in the present specification, the term "semi-supervised learning" is a class of supervised learning tasks and techniques that also make use of unlabeled data for training, typically a small amount of labeled data with a large amount of unlabeled data. The methods of the present application utilize graph-based semi-supervised algorithms, e.g., label propagation. In the label propagation algorithm, each document iteratively propagates its own label to similar documents. In the present methods, a "Latent Semantic Indexing (LSI)" algorithm is implemented for finding approximate "K-Nearest Neighbours". This is accomplished by applying a trained K-Means model to a small labeled dataset to obtain the label for each cluster. Next, smart sampling of the documents is performed (e.g., 30% of the closest documents to a centroid, 30% of the furthest documents from the centroid and 40% from between the closest and furthest) to select documents for manual review. After a manual review process is completed of the labeling of the documents (confirmation or correction of the labeling), if the user did not find any other labels in the same cluster the labels are propagated across the whole cluster.

Another semi-supervised machine learning utilized in the methods of the present application is active learning, in which a learning algorithm is able to interactively query the user (e.g. document owner) to obtain desired outputs at new data points. In statistics literature, active learning is also called optimal experimental design. There are situations in which unlabeled data is too abundant to involve manual labelling. For example, in large organizations have billions of document legacies, active learning algorithms can query the document owner for labels. This type of iterative supervised learning is called active learning.

Figure 1C:
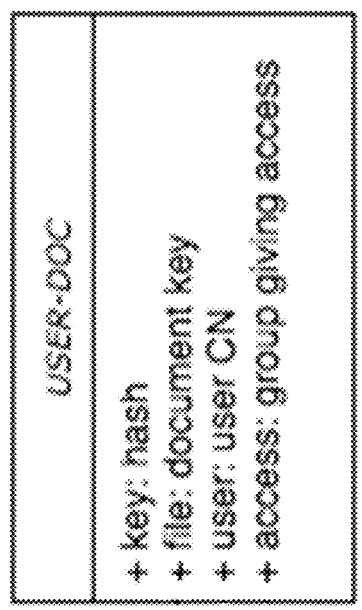

In view of the above, FIG. 1 depicts a schematic diagram of a file management platform system 104 in which a method for content and context aware data confidentiality classification is implemented in accordance with an example of the present application.

In the present example, based on the method for content and context aware data confidentiality classification, the file management platform system 100 scans (not shown) one or more documents in one or more network data repositories of a computer network and extracts (shown as step 110) content features and context features of the one or more documents into one or more term frequency-inverse document frequency (TF-IDF) vectors. An example of such a network data repository is shown in FIG. 1 with reference numeral 102. The one or more network data repositories can be network attached storages or shared drives. For the sake of simplicity, only one network data repository is depicted in FIG. 1, and the computer network is not shown.

As shown in FIG. 1, the file management platform system 100 includes a back-end framework 104 and a front-end user interface (UI) 108. In the present example, users of the file management platform system 100 may include information security team members and file/record/data owners who are able to interact with the UI 108.

As shown in FIG. 1, the file management platform system 100 may include a data ingestion module 126 in the back-end framework 104. The data ingestion module 126 is responsible for importing one or more document from the one or more network data repositories, and storing them in useful forms in a database 116 of the file management platform system 100. The file management platform system 100 may be implemented and/or administered by one or more servers (not shown) in the computer network. In various embodiments of the present application, the database 116 serves as the durable data storage of the entire file management platform system 100. It is the data source and destination for almost all applications in the file management platform system 100. The database 116 is built with HBASE for its scalability and speed for random reads/writes.

In an embodiment of the present application, Apache Kafka is used for data communication between the back-end framework 104 (which in the present application correspond to servers/Kafka brokers in a Kafka system), and the one or more network data repositories. On the producer side (i.e. application that sends information), a fetcher sends data feeds from the more network data repositories to Kafka brokers. Data feeds fill up partitions of a topic in a round-robin fashion. On the consumer side (i.e. application that receives information), each Spark Streaming executor independently receives data partitions form the back-end framework 104 and processes them in parallel. Apache Tika auto parser will extract content features and/or context features of the one or more documents from metadata and content data of the one or more documents. The content features and/or context features of the one or more documents can be then processed by natural language processing (NLP), vectorized into term frequency vectors and then converted into term frequency-inverse document frequency (TF-IDF) vectors for machine learning.

In the data ingestion module 126, Spark Streaming slices received data into batches according to time. For example, if batch interval is configured as 10 seconds, the data received in the 10-second period will form a resilient distributed datasets (RDD), which will be then processed in the next 10 seconds period. If one batch takes more than 10 seconds to process, it creates a delay to the consecutive batches. If all batches take more time than the batch interval to process, buffered data batches will pile up indefinitely and the system will eventually crash.

Thus, in the present application, the Spark Streaming is tuned to make average batch processing time as close to the batch interval as possible. If average batch processing time is less than the batch interval, throughput can be increased by speeding up the producer side; if average batch processing time is greater than batch interval, it will become necessary to speed up consumers or slow down producers in order to avoid instability.

In the present application, a "direct approach" is utilized to integrate Spark Streaming with Apache Kafka, which means that the number of RDD partitions created will automatically be the same as the number of Kafka partition of that topic. Since each partition will be allocated to one executor in Spark, and it is advisable that each executor receives 2-3 tasks per job to strike a good balance between task allocation and process. In addition, since it is desired to distribute partitions as evenly as possible to Kafka brokers, the number of Kafka partitions should be multiple of number of Kafka brokers.

To maximize parallelism, Kafka brokers are running on all cluster nodes. Assuming there are 3 available cores per node (1 core per node is reserved for other services), for 12 cores in the cluster, according to the above conditions, one recommended configuration of streaming for maximized parallelism is:

NUMBER OF KAFKA BROKERS=4
NUMBER OF EXECUTOR=TOTAL NUMBER OF CORES IN CLUSTER=12
NUMBER OF KAFKA PARTITIONS=2 OR 3×NUMBER OF EXECUTORS=24 OR 36

At the users' side, the UI 108 is used by the users to perform automatic records and files indexing, classification, categorization and anomaly detection/monitoring. As shown in FIG. 1, in the present example, the UI 108 is configured to make (shown as step 112) HTTP requests with the back-end framework 104 via a RESTful API 106 provided by DJANGO. The HTTP requests may include read/write requests for viewing, downloading and/or updating certain documents in the one or more network data repositories.

In an embodiment, the RESTful API 106 communicates (shown as step 114) with the database 116 of the file management platform system 100 through Happybase, a Thrift-based Python library. Happybase sends (shown as step 118) the read/write requests to a HBase Thrift server 120 (included in a HBASE distribution). Finally, the HBASE Thrift server 120 executes the requested viewing, downloading and/or updating operations in the database 116.

In the present example, the content features are based on content data of the one or more documents. The context features are based on metadata of the one or more documents. Metadata of the one or more documents includes file paths, file size, file extension, document owners, predicted/validated categories and confidentiality levels based on the present and/or previous machine learning, etc. The metadata is stored in the database 116.

As shown in FIG. 1, the one or more documents in the one or more network data repositories may be in various formats, such as PDF, XLS, DOC, PPT, TXT, etc. Such format information indicative of document type is usually indicated by a file extension of a document, and is usually mentioned in a file path of the document. The file path is usually represented in uniform naming convention, e.g., \\Server01\userA\docs\Letter.txt. The file path may be considered as a portion of metadata of the document.

In an embodiment of the present application, the file management platform system 100 utilizes Apache Tika™ toolkit to extract the content features and context features of the one or more documents from the one or more network data repositories. The Apache Tika™ toolkit supports all the various formats as described above and parses all of these through a single interface—the auto parser in its Java API, which makes it very easy to use. However, in the process of scanning all of the documents in the one or more network data repositories, it is noted that Apache Tika™ is unable to handle encrypted documents (since passwords are not available).

In an embodiment of the present application, in the step of extracting content features and context features of the one or more documents into one or more TF-IDF vectors, the file management platform system 100 is configured to extract content features from content data of each document of the one or more documents by conducting one or more natural language processing (NLP) steps. The NLP steps comprise steps of:

recognizing language of the content data of the document;
splitting content data of the document into tokens of words;
removing stop words and punctuation marks from the tokens of words;
transforming each of the tokens of words into a word stem, word base or word root; and
extracting content features of the document by extracting all the transformed tokens of words of the content data.

In an embodiment of recognizing language of the content data of the document, the present method utilizes Apache Tika™ toolkit to detect/recognize 18 languages among all the 184 standard languages standardized by ISO 639-1. In this embodiment, language detection is done using the getLanguage( ) method of the LanguageIdentifier class. This getLanguage( ) method returns a code name of respective language in string format. The following is a list of 18 language-code pairs that are recognizable by the present method using Apache Tika™.

da—Danish de—German et—Estonian el—Greek
en—English es—Spanish fi—Finnish fr—French
hu—Hungarian is—Icelandic it—Italian nl—Dutch
no—Norwegian pl—Polish pt—Portuguese ru—Russian
sv—Swedish th—Thai Along with Tika jar, Apache Tika™ provides a Graphical User Interface application (GUI) and a Command Line Interface (CLI) application, which allows users to execute a Tika application in response to a command prompt like other Java applications.

In an embodiment of splitting content data of the document into tokens of words, a text body of the document is split into tokens of word strings by breaking the text body to remove blank space or other unwanted characters.

Subsequently, stop words such as "a", "the", and any punctuation marks, are removed from the tokens of words in the step of removing stop words and punctuation marks from the tokens of words.

Thereafter, in the step of transforming each of the tokens of words into a word stem, word base or word root, each of the tokens of words is transformed into a word stem, word base or word root in order to reduce inflected or derived words.

Then, all the transformed tokens of words of the content data are extracted as content features of each of the one or more documents.

In the present application, the metadata of the one or more documents is considered as context features of the one or more documents. The metadata of the one or more documents is naturally correlated with its content data and accordingly its one or more category classifications. For example, in network data repositories of an organization, some folders may be more specific to certain categories. For example, "Human Resources" folders located at root of a Shared Drive may contain Employee, Corporate Entity, and/or Legal documents, but not Transaction or Customer/Client documents. Further, users of the network data repositories (mostly employees of the organization) tend to organize documents of a same project in a same parent folder. Furthermore, folder names and file names are often related to document categories, and document types might have rough correlation towards categories. For instance, spreadsheets could appear more frequently in Accounting/Tax than other categories.

In the present application, context features extracted from metadata of one or more documents, such as file paths and file extensions, are used to construct additional feature vectors for each of the one or more document.

In the present application, the overall procedure of extracting context features from the metadata is similar to the extracting of content features from the content data as described above. This is because metadata such as file path and file extension can be seen as a document content. However, there are a few differences in the NLP steps between the context feature extraction and the content feature extraction, which are described below.

In an embodiment of the present application, in the step of extracting content features and context features of the one or more documents into one or more TF-IDF vectors, the file management platform system 100 is configured to extract context features from metadata each document of the one or more documents by conducting one or more natural language processing (NLP) steps. The NLP steps comprise steps of:

splitting metadata of the document into tokens of word strings, wherein the tokens of word strings are divided by symbols in the metadata;
retaining tokens of word strings that contain alphabets and/or digits; and
extracting context features of the document by extracting all the retained tokens of word strings of the metadata.

In the above embodiment, metadata of the document, such as a file path, is split into tokens of word strings divided by symbols. In the embodiment, tokens containing alphabets and/or digits are retained as digits appear often in a directory. In addition, file names and file paths are usually much shorter than document contents. By keeping digits/numbers in the tokens of word strings, the present application is advantageous as it retains much more information in directory structures and files names without increasing too many hash conflicts.

In this manner, all the retained tokens of word strings of the metadata are extracted as context features of each of the one or more documents.

In view of the above, the above steps produce a cleaner array of tokens of words representing content data and context data for each of the one or more documents.

The cleaner arrays of tokens of words of the content data and context data of the one or more documents are then vectorized into one or more bag-of-words (BOW) representations in a vector space. Each distinct word/term found in the cleaner arrays of tokens of words of the one or more documents is defined as a dimension of the vector space. A consolidation of all the tokens of words is called vocabulary and constitutes the base of the vector space. In a high dimensional space, each document will be represented as a linear combination of the base vectors, with weights being the number of occurrences of the corresponding terms in the document. These weights try to capture the importance of terms for the meaning of documents. This approach comes from the "Information Retrieval" domain, and is known as "Vector Space Model". A common representation of the vector space model is a document-term matrix, in which each column represents a term/word (element of the vocabulary and vector of the base) and each row represents a document (collection of words/terms). Each cell in the document-term matrix contains the weight of the term in the corresponding document.

The BOW representation of each of the one or more documents is a sparse vector where each dimension represents a unique word, and the corresponding element value is the number of occurrences of that word in the text body. While a dictionary can be used to store the mapping between index words and dimensions, this would require maintaining a universal dictionary of the whole dataset across all network data repositories. Since keeping a huge dictionary containing possible millions of entries in memory is impractical, an out of core approach can be utilised.

In an embodiment of the present application, a hashing method is used, in which each word of interest is mapped into an index number by applying a hash function. In an embodiment, the feature dimension is set to 2(20), meaning that indices range from 0 to 2(20)−1, hence the TF-IDF vectors are 2(20) dimensional. In this manner, the present application advantageously avoids computation and memory required for building the dictionary.

In BOW representations, each feature vector contains term frequencies. However, in a document category classification context, a more frequent word in a document might not have as much as distinguishing power as a less frequent word. To address this issue, a weighting approach TF-IDF is utilized in the present application.

In an embodiment of the present method, the one or more BOW representations of the one or more documents are converted respectively into one or more TF-IDF vectors. Additionally, the TF-IDF vectors can be normalized to remove extreme values and preserve vector sparsity, during which each feature vector is made to have a same L2 norm.

The IDF factor reduces the weight of words that occur very frequently in the one or more documents, while increasing the weight of words that occur rarely. Where, ft,d is number of occurrences of the term t in document d, |D| the size of the document set D, |{d epsilon D: t epsilon d}| the number of documents where the term t appears. Note that a smoothing term is added to the denominator to avoid division-by-zero when the term is outside of the corpus.

In practice, the above steps require careful memory optimization. Despite several GBs of memory allocated to each JVM or executor, errors such as "javalang.OutOfMemoryErrors" may arise when the one or more network data repositories contain large documents. Quality control and memory usage alert is then required.

The present application further addresses the above constraints by reducing dimensions of the TF-IDF vectors to transform the data into a lower-dimensional model to avoid irrelevant information and all the additional redundancy.

In an embodiment of reducing dimensions, the one or more TF-IDF vectors are projected into a latent semantic indexing (LSI) space based on a desired level of retained variance to transform the TF-IDF vectors to LSI vectors. Additionally, the projected TF-IDF vectors in the reduced LSI space (i.e., the LSI vectors) can be standardized, during which each attribute/feature is made to have zero mean and unit variance.

LSI refers to a technique in Information Retrieval to identify patterns in the relationships between terms and concepts contained in an unstructured document set by using statistically derived conceptual indices instead of individual words. In the present embodiment, a truncated Singular Value Decomposition (SVD) is used to represent document and term vectors in concept spaces with reduced dimensionality. It has the benefits of overcoming lexical matching problems caused by synonymy (different words with the same meaning) and polysemy (one word with multiple meanings). The one or more documents are thereby formulated into a term-document matrix, where each row represents a term, and each column represents a document.

LSI looks for orthogonal directions of the maximum data variance. That is, it finds the directions which best characterize the differences in the data. These directions by themselves can be very meaningful. Using LSI, for a given number of dimensions, one can find the best possible linear representation in terms of variance. Of course, variance here depends on the space and current distance measure. In case of word counts, words that appear very often will have very high weight in Cartesian space. One can avoid these problems by taking a log of the number of occurrences therefore transforming the problem from the best representation in terms of word counts towards one that cares more about the actual presence of the words in a document.

In various embodiments of the present application, the above described steps of extracting content features and context features of the one or more documents into one or more term frequency-inverse document frequency (TF-IDF) vectors and the NLP steps are implemented by a feature engineering module 122 of the file management platform system 100. Useful content features and context features are thereby explored and built up from content data and context data.

In various embodiments of the present application, the feature engineering module 122 is further configured to split the one or more documents into a labeled set and an unlabeled set. The labeled set is randomly split into a raw labeled training set and a raw test set based on a predetermined ratio. The unlabeled set is then merged with the raw labeled training set to form a raw training set. The content features and context features of the raw training set and the raw test set are extracted into one or more TF-IDF vectors based on the extracting steps and then transformed to LSI vectors as described above. The raw training set and raw test set will be used in the machine learning.

In some embodiments, intermediate and final outputs of the content features and context features, such as the content features, the context features, the BOW representations and the LSI vectors of the one or more documents, are stored in Hadoop Distributed File System (HDFS) 126 of the management platform system 100 as RDD object files for faster I/O.

In some embodiments, the intermediate and final outputs of the content features and context features, such as the content features, the context features, the BOW representations and the LSI vectors of the one or more documents, are stored in the database 116 of the file management platform system 100. In particular, the content features, the context features, the BOW representations and the LSI vectors of the one or more documents are stored in a plurality of interlinked tables. The LSI vectors can be stored in HBASE tables or in other formats. The interlinked tables of LSI vectors mainly include three tables:

1. First table: An example of the first table, DOCMETA, is depicted in FIG. 1B. The first table stores the metadata of the one or more documents and is built by conducting a complete scan on the one or more network data repositories. As described above, the metadata includes file paths, file size, file extension, document owners, predicted/validated categories and confidentiality levels based on the present and/or previous machine learning, etc.

The first table serves as an interface for connecting the machine learning engine 124 and web applications. For example, the machine learning engine 124 outputs predictions of category classifications and confidentiality classifications to the first table, and then users of the web applications get the predictions and provide validations or corrections which will also be stored in the first table. Multi-versioning is enabled in the first table to allow developers to keep track of historical changes in metadata, predictions, and validations.

In the first table, each row corresponds to a file path of each of the one or more documents. In particular, row keys are SHA-256 hashed file paths. This means that file paths are used as file identifiers. In this manner, each file on the one or more network data repositories corresponds to exactly one row in this table. Once a file is moved to a new location, it will produce a new row, and the old row corresponding to the original location must be removed. In addition, hashing is used to make sure that all row keys have equal lengths and to avoid "hotspotting" (requests not being distributed evenly but going to one or a few cluster nodes, which impairs the performance).

Metadata are categorized into two groups according to use cases. First type is file system native metadata such as file size, extension, creation date, owners, etc., which is updated when a complete scan of the one or more network data repositories is conducted for synchronization. Second type is classification-related metadata, including document label(s) and predicted/validated category classification(s) and confidentiality classification(s), which are updated when a more truthful answer is made by a clustering model, an administrator of the file management platform system who may be an information security or information risk management team member, or a record/file/data owner. Updates of the first type of metadata are likely to happen on system off-line period (e.g. weekends), while updates of the second type of metadata may probably happen on every business day. Because of such different access patterns, each of the two types of metadata is assigned to a separate column family for better I/O.

Using the first table to get a complete list of documents owned by a user, a complete table scan is needed, which is unacceptably expensive given that a user usually owns a tiny fraction to files on the one or more network data repositories. To obviate the complete table scan, a second table: USER-DOC, is utilized.

The second table is a supplement to the first table, and is an example of database normalization. In an example of the second table depicted in FIG. 1C, each of its equal-lengthed row keys is a byte array created by concatenating a user ID (a Long) and hashed file path. For example, if there are 3 users, and each of them owns 5 documents, 3×5=15 rows will be generated in the second table. To get a list of documents owned by a user, since rows are stored in lexicographically sorted order, only one short HBASE "range scan" is required by using the user's ID as prefix.

In an alternative example of the second table, user IDs is used as row keys and lists of documents are used as columns. Compare two examples in two scenarios: document-wise case and user-wise case. In the document-wise-case, a document owned by P users is to be retrieved, added, or removed from the table. The first example of the second table is superior and takes only P row-operations to complete, while the alternative example of the second table needs 2P row-operations: P row-reads plus P row-writes to update the document lists. In the user-wise case, a user owning Q documents is to be retrieved, added, or removed from the table. The first example of the second table takes one Scan of length Q, while the alternative example of the second table requires 1 row-operation. There is only little performance overheard for the first example of the second table because single row operation is internally implemented as a Scan of length 1. To sum up, the first example of the second table has a better performance than the second example of the second table.

The database 116 of the present file management platform system may further include a third table: BOW table, an example of a third table, is depicted in FIG. 1D.

The third table stores vectorize d content features of the one or more documents. Again, hashing is used. Its same-sized row keys are SHA-256 hashed content features. This means that duplicate file contents will be omitted automatically during the process of data ingestion. Document content vectors are term frequency (TF) vectors, and TF vectors are usually sparse. To preserve the sparsity in the vectors, 3 columns are used in the table: (1) "size" column stores the total length of each sparse vector, (2) "indices" column stores an array of indices of non-zero elements (which are the word indices), and (3) "values" column stores an array of term frequencies corresponding to the indices. The length of every indices array must equal to the length of every values array. In the present application, single column family is used because all columns will be read together.

Figure 4:
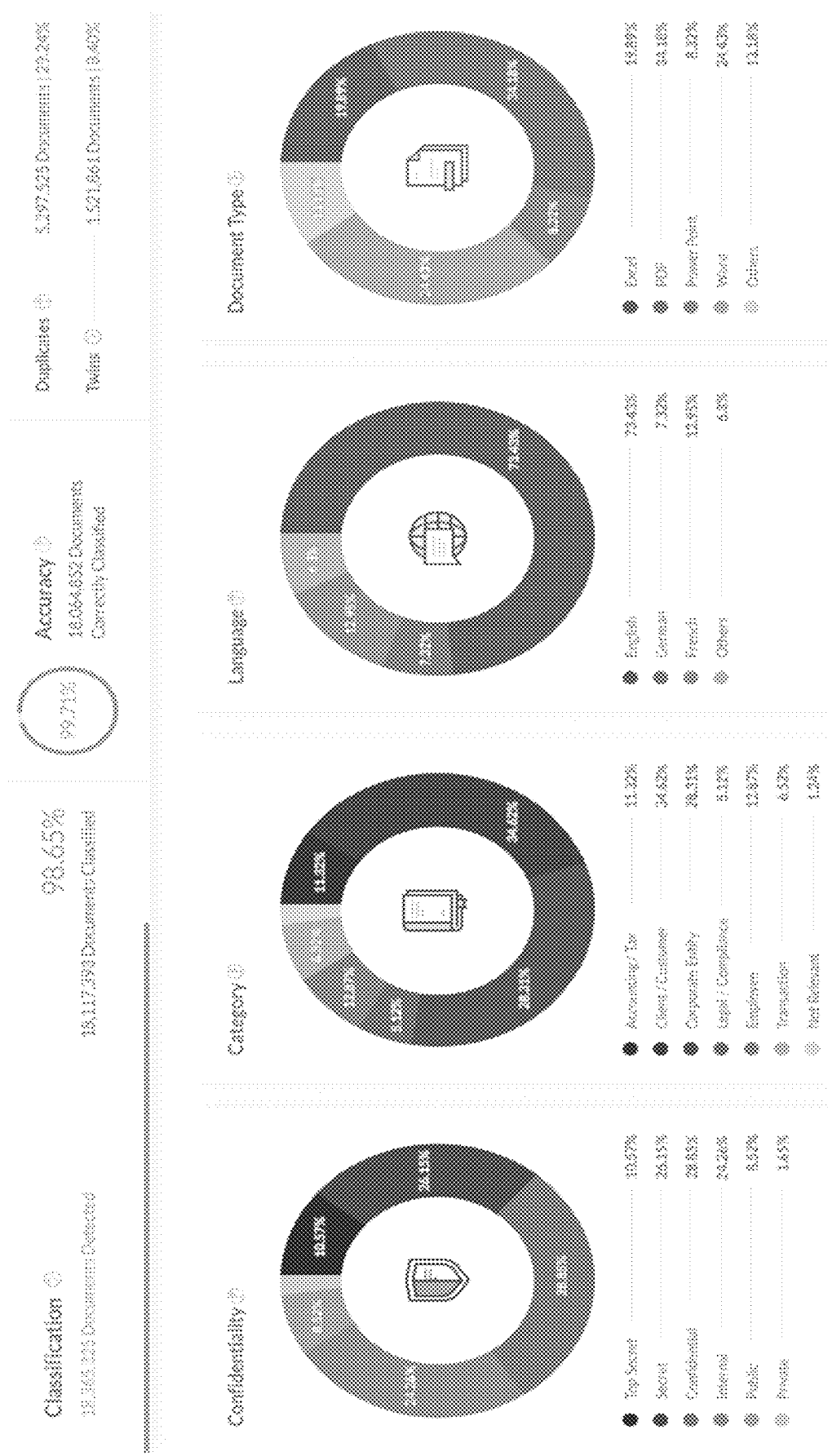
FIG. 4 depicts a user interface of a file management platform system for content and context aware data classification in accordance of an example of the present application.

A visualization of one or more of the category classification, confidentiality classification, language, and/or document type of each of the one or more documents may be generated based on at least the first table. The visualization may be presented at the user's side 108 on a user interface of the present file management platform system 100, as illustrated in FIG. 4.

The content features, context features, BOW representations and LSI vectors stored in the database 116 are read by a machine learning engine 124 of the present file management platform system 100, and trained by machine learning at the machine learning engine 124 for classifying the one or more documents into a number of category classifications. Each of the category classifications is associated with one or more confidentiality classifications.

As the raw training set includes a portion of unlabeled documents and a portion of labeled documents, several machine learning methods can be used in the present application.

In an embodiment, the machine learning engine 124 uses an unsupervised learning method, such as Clustering, to analyze the LSI vectors of the raw training set in order to predict one or more clustering models. Each clustering model clusters the one or more LSI vectors into a number of category classifications. Each of the category classifications is associated with one or more confidentiality classifications. For example, the number of category classifications may include category classifications comprising: Corporate Entity, Legal/Compliance, Client/Customer, Accounting/Tax, Employee/Personal Document, Transaction, etc. In the present embodiment, the confidentiality classifications include: Top Secret, Secret, Confidential, Internal, Public, and Private. In an example, the Corporate Entity category may be associated with two confidentiality classifications such as Internal and Confidential.

In the Clustering method, categorisation can be performed using Cluster/Centroid Labelling by computing a cluster centroid for each category and then categorize the documents if they are closer to the category cluster centroid than a certain threshold determined during training. The Clustering method can be either soft or hard. A hard clustering algorithm categorizes the documents to the clusters exclusively. A soft clustering algorithm may categorize a document to multiple clusters and assign to each categorization a confidence level.

An example of hard clustering algorithm is K-Means Clustering. K-Means Clustering clusters documents into k clusters using the Euclidean distance to compute geometrical centres of the clusters or centroids. The K-Means clustering includes steps as follows:
1. Initialize k clusters by randomly choosing k data points
2. Until there is no change (convergence reached), conduct the following:
   For each document, assign the document to the closest cluster centroid,
   For each cluster, compute the centroid of the documents assigned to each cluster, and
   Update the cluster centroids to the new centroids.

In an alternative embodiment, the machine learning engine 124 can use a semi-supervised learning method, such as label propagation algorithm, to analyze the LSI vectors of the training set in order to predict one or more clustering models. Similar to the above embodiment, each clustering model clusters the one or more LSI vectors into a number of category classifications. Each of the category classifications is associated with one or more confidentiality classifications.

Among the one or more predicted clustering models, the machine learning engine 124 selects one clustering model based on a confirmation of its corresponding category classifications by an administrator of the computer network. The administrator can be an information security employee of the organization who is in charge of the data classification process.

The selected clustering model can be evaluated by applying the selected clustering model to cluster the documents in the raw test set. If the evaluation of the selected clustering model produces same category classifications as the labels in the raw test set, the machine learning engine 124 classifies all of the one or more documents into the category classifications produced by the selected clustering model. However, if the evaluation of the selected clustering model produces different category classifications from the labels in the raw test set, the machine learning engine 124 will select another clustering model from the one or more clustering models. The selected other clustering model will also be evaluated. The evaluation results may be stored in the database 116 of the present file management platform system 100 for comparison and analysis.

Advantageously, the machine learning engine 124 can further prompt a request to the respective owner of the one or more documents for validating the accuracy of the category classifications predicted by the one or more clustering models or the category classifications selected after confirmation by the administrator of the computer network. The validation by the respective owner of the one or more documents provides a primary/first line of defense for proper document handling, while the confirmation by the administrator of the computer network provides a secondary line of defense for proper document handling.

There are two built-in Machine Learning libraries in Spark. "Spark mllib" provides a wide variety of bare-bone ML algorithms built on top of RDDs, but it lacks support for standard ML procedures such as cross validation. "Spark ml" provides higher-level APIs on-top of DataFrames to construct a standard ML pipeline, but it is still in experimental stage and misses some of the important ML algorithms (like SVM and multi-class Logistic Regression). Due to this situation, the present machine learning engine is constructed by mixing both: several wrappers around mllib ML algorithms are created so that these missing pieces can be inserted into the Spark machine learning pipeline. Besides, Spark ml classes are modified in the present application for Validation to extend the functionality.

For evaluation and validation of the category classifications and the confidentiality classifications, the machine learning engine 124 of the present file management platform system uses the following methods.

The following classification measures are used. The notation is as follows: for predictions of class i,
   $TP_i$ (true positive) represents the number of correct predictions (class i classified as i);
   $FP_i$ (false positive) represents the number of incorrect predictions (class j classified as i), and
   $FN_i$ represents the number of missing items that should be classified as i (class i classified as j).
   The size of the entire dataset is denoted as m, and the number of classes as C.

A first method used for evaluation and validation of the category classifications and the confidentiality classifications in the present application is Accuracy. Accuracy is one of the most popular and intuitive measure. It is defined by the fraction of correct predictions across all classes of a model. Accuracy is used as the main performance indicator in model selection.

A second method used for evaluation and validation of the category classifications and the confidentiality classifications in the present application is Precision and Recall. Precision and Recall are widely employed in Information Retrieval. Precision represents the fraction of the retrieved items that are relevant, while recall represents the fraction of relevant items that are retrieved. In classification, Precision and Recall can be used in class-specific classifications or multi-class classifications. In multi-class classifications, one can use Macro-average/Micro-average Precision/Recall to have an aggregated evaluation on a model. In fact, Micro-average Precision and Recall are equal to Accuracy, thus only Macro-average Precision and Recall is used in the following experiments. This is because the number of class-j-items incorrectly labelled as i is counted into $FP_i$ and meanwhile contributes the same amount to $FN_i$.

A sum of all TP and FP, or equivalently all TP and FN, will be exactly m, which is the total size of the dataset.

A third method used for evaluation and validation of the category classifications and the confidentiality classifications in the present application is F-measure. F-measure is a weighted average of Precision and Recall. The choice of beta depends on the objective of the system: whether Precision or Recall should receive more emphasis.

F1
   score (F-measure with \beta=1) is the harmonic mean of Precision and Recall and is a balanced measure between the two.

F2
   score weights recall higher than precision, while F0.5 F-score weights precision higher than recall. Since in multi-class classification, Micro Precision and Micro Recall are equal to Accuracy, F-measures computed by them will equal to Accuracy as well. As an alternative, Macro F-measures can be computed by Macro-Precision/Recall. Another option is to use the weighted F-measure, which is the weighted sum of F-measures from all classes in proportion to label sizes.

In addition, the file management platform system 100 may further include an anomaly detection module 128. The anomaly detection module 128 is able to, upon receiving a request from a user to access one of the one or more documents wherein the request includes content or context data of the document such as a file path, identify a confidentiality classification of the document based on the machine learning as described above. The anomaly detection module 128 further determines a security access control level of the user based on lightweight directory access protocol (LDAP) extraction, and detects a data security anomaly if the security access control level of the user is lower than the confidentiality classification of the document. If the security access control level of the user is not lower than the confidentiality classification of the document, the anomaly detection module 128 is configured to grant an access to the user.

The anomaly detection module 128 is further configured to generate a data security anomaly report in response to the detection of the data security anomaly, and present the data security anomaly report to an administrator of the computer network, the owner of the document, and/or the user who sent the request.

As described above and as shown in FIG. 1, the present file management platform system 104 at least includes a feature engineering module 122 and a machine learning engine 124. As described above, the feature engineering module 122 is configured to split one or more documents in one or more network data repositories of the computer network into a labeled set and an unlabeled set, wherein the labeled set is randomly split into a raw labeled training set and a raw test set based on a predetermined ratio, wherein the unlabeled set is merged with the raw labelled training set to form a raw training set, extract the content features and context features of the documents in the raw training set, vectorize the content features and the context features of the documents in the raw training set into one or more bag-of-words (BOW) representations, convert the one or more bag-of-words (BOW) representations of the documents in the raw training set respectively into one or more term frequency-inverse document frequency (TF-IDF) vectors, and project one or more TF-IDF vectors of the documents in the raw training set into a latent semantic indexing (LSI) space based on a desired level of retained variance to transform the TF-IDF vectors into LSI vectors. The machine learning engine 124 comprises a model training module, a model evaluation module, and a data classification engine.

The model training module is configured to predict one or more clustering models based on machine learning the LSI vectors of the documents in the raw training set, each clustering model clustering the one or more LSI vectors into a number of category classifications, each of the category classifications being associated with one or more confidentiality classifications, and select a clustering model from the one or more clustering models based on a confirmation of its corresponding category classifications by an administrator of the computer network.

The model evaluation module is configured to evaluate the selected clustering model by applying the selected clustering model to cluster the documents in the raw test set.

The data classification engine is configured to classify all of the one or more documents into the number of category classifications using the selected clustering model if the evaluation of the selected clustering model produces same category classifications as the labels of the raw test set, and indicate to the feature clustering module to select another clustering model from the one or more clustering models if the evaluation of the selected clustering model produces different category classifications from the labels of the raw test set.

Figure 2:
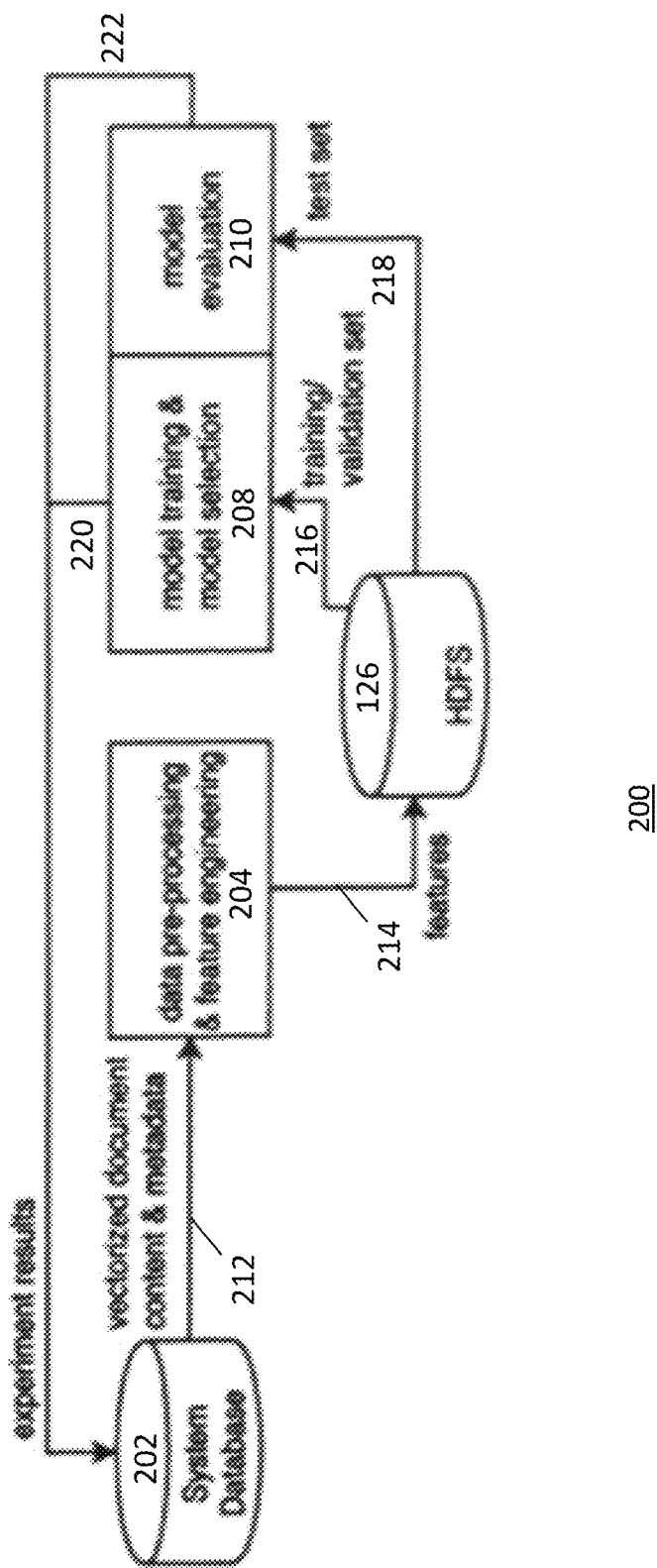
FIG. 2 depicts a block diagram showing feature engineering steps and machine learning steps in accordance with an embodiment of the method for content and context aware data confidentiality classification.

FIG. 2 depicts a block diagram showing feature engineering steps and machine learning steps in accordance with an embodiment of the method for content and context aware data confidentiality classification.

As shown in FIG. 2, vectorized content features and context features of the one or more documents in the one or more network data repositories are read from a database 202 of a file management platform system (not shown) in step 212 by a data pre-processing and feature engineering module 204 of the file management platform system.

As described above with respect to FIG. 1, the vectorized content features and context features of the one or more documents are the cleaner arrays of tokens of words of the content data and context data of the one or more documents which are vectorized into one or more bag-of-words (BOW) representations in a vector space.

The data pre-processing and feature engineering module 204 may include a data pre-processing sub-module (not shown) and a feature engineering sub-module (not shown).

The data pre-processing sub-module is configured to convert the vectorized content features and context features (i.e. the vectorized BOW representations) into one or more term frequency-inverse document frequency (TF-IDF) vectors; and transform the TF-IDF vectors to LSI vectors based on a desired level of retained variance so as to reduce dimensions of the vectors. The data pre-processing sub-module can further be configured to split the one or more documents into a labeled set and an unlabeled set, randomly split the labeled set into a raw labeled training set and a raw test set based on a predetermined ratio, and merging the unlabeled set with the raw labelled training set to form a raw training set.

The feature engineering sub-module is then configured to extract the content features and context features of the documents in the raw training set, vectorize the content features and the context features of the documents in the raw training set into one or more bag-of-words (BOW) representations, convert the one or more bag-of-words (BOW) representations of the documents in the raw training set respectively into one or more term frequency-inverse document frequency (TF-IDF) vectors, and to transform the TF-IDF vectors to LSI vectors based on a desired level of retained variance.

In the embodiment shown in FIG. 2, the vectorized content features and context features and their outputs from the data pre-processing and feature engineering module 204 such as the LSI vectors of the documents in the raw training set are stored and the stored and analyzed by machine learning in a model training and model selection module 208 and a model evaluation module 210.

In step 216, the vectorized content features and context features and the LSI vectors of the documents in the raw training set are transmitted to the model training and model selection module 208. The model training and model selection module 208 may include a model training sub-module model (not shown) and a model selection sub-module (not shown).

The model training sub-module model can be configured to predict one or more clustering models, each clustering model clustering the one or more LSI vectors of the documents in the raw training set into a number of category classifications, each of the category classifications being associated with one or more confidentiality classifications.

The model selection sub-module can be configured to select a clustering model from the one or more clustering models based on a confirmation of its corresponding category classifications by an administrator of the computer network. The selected clustering model may be further validated by one or more owners of the one or more documents. If the selected clustering model is further confirmed by the one or more owners, the selected clustering model and the corresponding category classifications are stored into the database 202 in step 220. If the selected clustering model is modified by the one or more owners, the selected clustering model and the corresponding category classifications as well as the modified clustering model and the corresponding category classifications are stored into the database 202 in step 220.

In step 218, the vectorized content features and context features and the LSI vectors of the documents in the raw test set are transmitted to the model evaluation module 210.

The model evaluation module 210 is configured to evaluate the selected clustering model by applying the selected clustering model to cluster the documents in the raw test set. The evaluation results are stored into the database 202 in step 222.

If the evaluation of the selected clustering model produces same category classifications as the labels of the raw test set, a positive evaluation result is stored into the database 202 and is linked to the selected clustering model and the corresponding category classifications stored in step 220. If the evaluation of the selected clustering model produces different category classifications from the labels of the raw test set, a negative evaluation result is stored into the database 202 and is linked to the selected clustering model and the corresponding category classifications stored in step 220.

Although not shown in FIG. 2, it is understandable that if the evaluation of the selected clustering model produces same category classifications as the labels of the raw test set, all of the one or more documents can be classified into the number of category classifications using the selected clustering model. If the evaluation of the selected clustering model produces different category classifications from the labels of the raw test set, another clustering model needs to be selected from the one or more clustering models.

Figure 3:
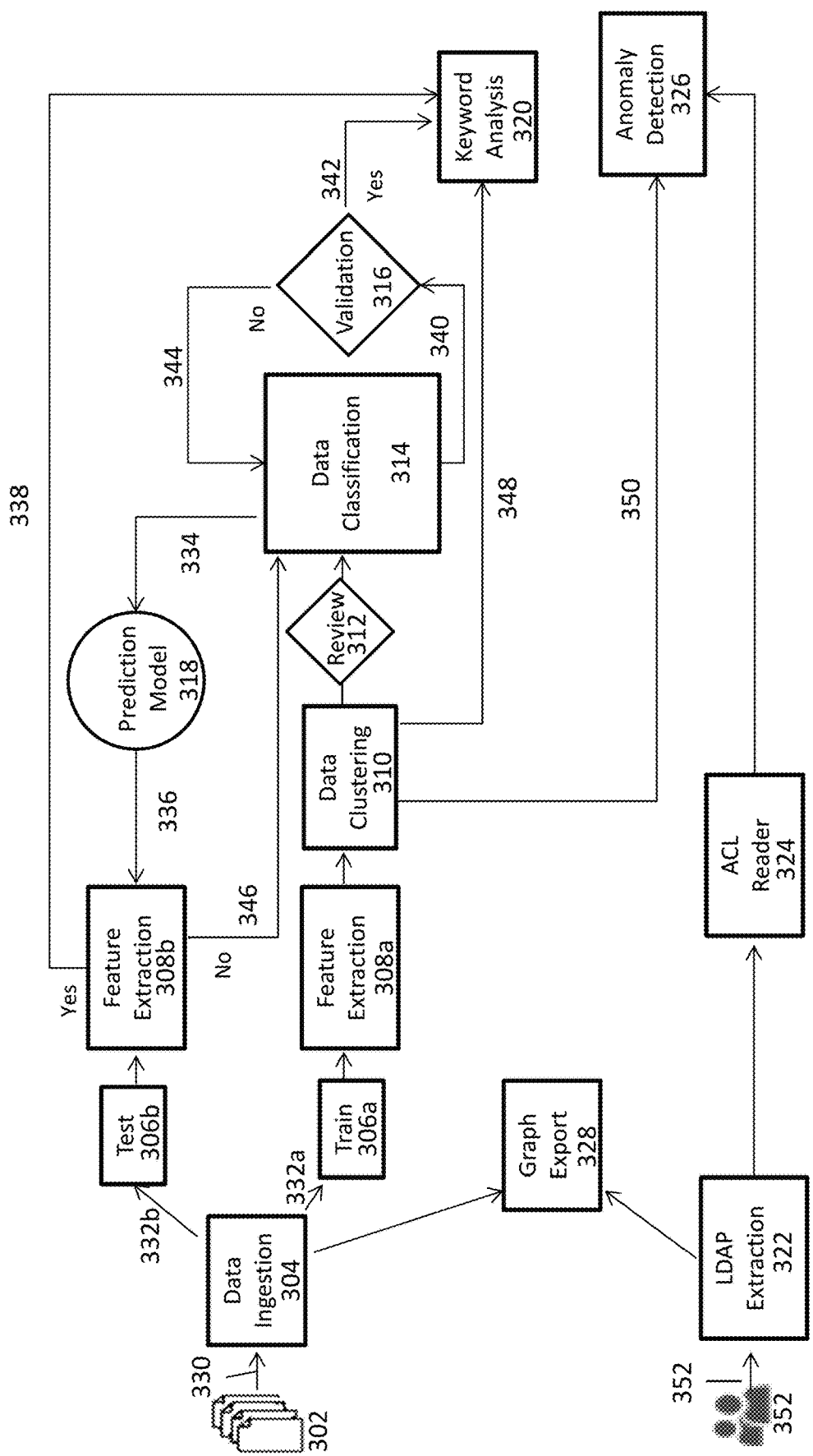
FIG. 3 depicts a schematic diagram of a file management platform system in which a method for content and context aware data confidentiality classification and a method for content and context aware data security anomaly detection are included included in accordance with another example of the present application.

FIG. 3 depicts a schematic diagram of a file management platform system in which a method for content and context aware data confidentiality classification and a method for content and context aware data security anomaly detection are included in accordance with another example of the present application.

As shown in FIG. 3, an embodiment of the present method for content and context aware data confidentiality classification includes scanning 330 one or more documents 302 in one or more network data repositories by a file management platform system. The one or more documents 302 are imported by a data ingestion module 304, and stored in useful forms in a database (not shown) of the file management platform system. The file management platform system may be implemented and/or administered by one or more servers (not shown) in the computer network.

The imported one or more documents 302 may be processed by the data ingestion module 304 to split 332a, 332b into a raw training set 306a and a raw test set 306b. For such splitting, the one or more documents 302 are firstly split into a labeled set and an unlabeled set. The labeled set is then randomly split into a raw labeled training set and a raw test set based on a predetermined ratio. The unlabeled set is then merged with the raw labeled training set to form a raw training set.

The content features and context features of the raw training set 306a and the raw test set 306b are extracted 308a, 308b into one or more TF-IDF vectors based on the feature extracting steps as described above with respect to FIG. 1. The extracted one or more TF-IDF vectors of the raw training set and the raw test set will be stored in the database as LSI vectors transformed from the TD-IDF vectors and the raw test set to be used in machine learning.

In the embodiment shown in FIG. 3, the LSI vectors of the raw training set 306a are analyzed using an unsupervised data clustering method 310 in order to predict one or more clustering models. Each clustering model clusters the one or more LSI vectors into a number of category classifications. Each of the category classifications is associated with one or more confidentiality classifications. For example, the number of category classifications may include category classifications comprising: Corporate Entity, Legal/Compliance, Client/Customer, Accounting/Tax, Employee/Personal Document, Transaction, etc. In the present embodiment, the confidentiality classifications include: Top Secret, Secret, Confidential, Internal, Public, and Private. In an example, the Corporate Entity category may be associated with two confidentiality classifications such as Internal and Confidential.

The one or more clustering models predicted by the unsupervised data clustering method 310 can be reviewed 312 by an administrator of the computer network to select a prediction model 318 at a data classification module 314 among the one or more clustering models upon a confirmation by the administrator of the computer network.

The prediction model 318 and its corresponding category classifications are sent 334 from the data classification module 314 to the database for applying the prediction model 318 to cluster 336 the one or more LSI vectors of the raw test set.

In the embodiment shown in FIG. 3, if the evaluation of the prediction model 318 produces same category classifications as the labels of the raw test set, the prediction model 318 and its corresponding category classifications can be forwarded 338 to a keyword analysis module 320 of the file management platform system for subsequent analysis. In addition, the prediction model 318 can be used to classify all of the one or more documents into the number of category classifications. The file management platform system may prompt 340 a request to one or more owners of the one or more documents for validation 316 of the prediction model 318 and the classified category classifications. If the prediction model 318 and classified category classifications are validated 340 by the one or more owners, the prediction model and the classified category classifications will be forwarded 342 to keyword analysis module 320 of the file management platform system for subsequent analysis. If the prediction model 318 and classified category classifications are not validated by the one or more owners, the file management platform system may indicate 344 to the data classification module 314 for selecting another clustering model from the one or more clustering models.

If the evaluation of the prediction model 318 produces different category classifications from the labels of the raw test set, the file management platform system may indicate 346 to the data classification module 314 for selecting another clustering model from the one or more clustering models.

Additionally, all the one or more clustering models predicted by the unsupervised data clustering method 310 can be forwarded to keyword analysis module 320 of the file management platform system for subsequent analysis.

In addition, an embodiment of the present method for content and context aware data security anomaly detection in the present file management platform system is also shown in FIG. 3. The embodiment of the present method for content and context aware data security anomaly detection includes receiving 352 a request from a user 352 to access one of the one or more documents stored in one of the one or more network data repositories, the request including content or context data of the document.

The embodiment of the present method for content and context aware data security anomaly detection also includes identifying 350 a confidentiality classification of the document based on the above described machine learning which uses the unsupervised data clustering method 310 in the present embodiment, determining 324 a security access control level (ACL) of the user based on lightweight directory access protocol (LDAP) extraction 322, and detecting a data security anomaly by an anomaly detection module 326 in the present file management platform system if the security access control level of the user is lower than the confidentiality classification of the document.

If the security access control level of the user is not lower than the confidentiality classification of the document, the anomaly detection module 128 is configured to grant an access to the user.

The anomaly detection module 128 is further configured to generate a data security anomaly report in response to the detection of the data security anomaly, and present the data security anomaly report to an administrator of the computer network, the owner of the document, and/or the user who sent the request.

In addition, metadata of the one or more document as imported by the data ingestion module 304 and the data obtained by the LDAP extraction can be presented as a visualization of one or more of the category classification, confidentiality classification, language, and/or document type of each of the one or more documents by a graph export module 328 in the present file management platform system. The visualization may be presented at the user's side on a user interface of the present file management platform system 100, as illustrated in FIG. 4.

FIG. 4 depicts a user interface of a file management platform system for content and context aware data classification in accordance of an example of the present application. The user interface shows a visualization of one or more category classifications, confidentiality classifications, language, document type, and other information of documents in one or more network data repositories of a computer network. The other information includes a percentage and/or number of documents classified in accordance with methods for content and context aware data confidentiality classification as described herein, an accuracy rate indicative of a percentage and/or number of the correctly classified documents.

By virtue of the user interface and the above described methods and machine learning engines, users are able to request the file management platform system to provide a list of documents owned by him/her, or query an arbitrary document owned by him/her.

In addition, users are able to update document metadata multiple times and/or use predictions as references to decide category classifications and confidentiality classifications of documents.

By virtue of the arrangement of the tables in the database, e.g. row keys of the third table as described above, users do not expect same documents with different metadata. Identical contents are excluded.

Thus, it can be seen that the embodiments of the present application advantageously provide a file management platform system that allows automatic documents (e.g. records, files, etc) indexing, classification, categorization and monitoring based on machine learning, more specifically, unsupervised machine learning and semi-supervised machine learning. Advantageously, the methods, machine learning engines, file management platform systems are both content aware and context aware, and are accurate and efficient without requiring large amount of time and labour needed for manual data confidentiality classification or for obtaining a huge amount of "labelled data" for supervised learning.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A method for content and context aware data classification, the method comprising:
   scanning one or more documents in one or more network data repositories of a computer network;
   extracting content features and context features of the one or more documents into one or more term frequency-inverse document frequency (TF-IDF) vectors and one or more latent semantic indexing (LSI) vectors, the step of extracting the content features and the context features of the one or more documents comprising:
   vectorizing the content features and the context features of the one or more documents into one or more bag-of-words (BOW) representations;
   converting the one or more BOW representations respectively into the one or more TF-IDF vectors; and
   projecting the one or more TF-IDF vectors into a latent semantic indexing (LSI) space based on a desired level of retained variance to transform the one or more TF-IDF vectors into the one or more LSI vectors;
   classifying the one or more documents into a number of category classifications by machine learning the extracted content features and context features of the one or more documents at a file management platform of the computer network, each of the category classifications being associated with one or more confidentiality classifications; and storing the content features, the context features, the one or more BOW representations and the one or more LSI vectors of the one or more documents into a plurality of interlinked tables in a database, wherein the step of storing the content features, the context features, the BOW representations and the LSI vectors comprises:

storing metadata of the one or more documents into a first table, the metadata including file paths, file sizes, file extensions, file owners, predicted category classifications and confidentiality classifications predicted by the machine learning, and/or validated category classifications and confidentiality classifications validated by the file owner, wherein each row of the first table corresponds to a file path of each of the one or more documents;

storing the metadata of the one or more documents into a second table, wherein the second table supplements the first table, and wherein each row of the second table corresponds to a concatenated data of a file owner with a hashed file path of each of the one or more documents owned by the file owner; and/or storing the content features of the one or more documents into a third table.

2. The method according to claim 1, wherein the step of extracting the content features and the context features of the one or more documents into the one or more TF-IDF vectors and the one or more LSI vectors comprises:

for each document of the one or more documents, extracting the content features from content data of the document by conducting one or more natural language processing (NLP) steps comprising:

recognizing language of the content data of the document;

splitting content data of the document into tokens of words;

removing stop words and punctuation marks from the tokens of words;

transforming each of the tokens of words into a word stem, word base or word root; and extracting the content features of the document by extracting all the transformed tokens of words of the content data.

3. The method according to claim 1, wherein the step of extracting the content features and the context features of the one or more documents into the one or more TF-IDF vectors and the one or more LSI vectors comprises:

for each document of the one or more documents, extracting context features from metadata of the document by conducting one or more natural language processing (NLP) steps comprising:

splitting metadata of the document into tokens of word strings, wherein the tokens of word strings are divided by symbols in the metadata;

retaining tokens of word strings that contain alphabets and/or digits; and extracting the context features of the document by extracting all the retained tokens of words of the metadata.

4. The method according to claim 1, wherein the step of classifying the one or more documents comprises:

clustering the one or more LSI vectors into the number of category classifications.

5. The method according to claim 1, further comprising:

splitting the one or more documents into a labeled set and an unlabeled set, randomly splitting the labeled set into a raw labeled training set and a raw test set based on a predetermined ratio, and merging the unlabeled set with the raw labelled training set to form a raw training set.

6. The method according to claim 5, wherein the step of machine learning the extracted content features and context features comprises:

predicting one or more clustering models based on machine learning the one or more LSI vectors of the documents in the raw training set, each clustering model clustering the one or more LSI vectors into a number of category classifications, each of the category classifications being associated with one or more confidentiality classifications;

selecting a clustering model from the one or more clustering models based on a confirmation of its corresponding category classifications by an administrator of the computer network;

evaluating the selected clustering model by applying the selected clustering model to cluster the documents in the raw test set; and if the evaluation of the selected clustering model produces same category classifications as the labels of the raw test set, classifying all of the one or more documents into the number of category classifications using the selected clustering model, and if the evaluation of the selected clustering model produces different category classifications from the labels of the raw test set, selecting another clustering model from the one or more clustering models.

7. The method according to claim 6, further comprising:

validating the classified category classifications by one or more owners of the one or more documents.

8. The method according to claim 1, further comprising:

generating a visualization of one or more of the category classifications, confidentiality classification, language, and/or document type of each of the one or more documents based on at least the first table.

9. A non-transitory computer readable medium comprising instructions which, when executed by a processor, make the processor perform a method for content and context aware data classification according to claim 1.

10. The non-transitory computer readable medium according to claim 9, further comprising instructions which, when executed by the processor, make the processor perform a method for content and context aware data security anomaly detection, comprising:

machine learning content and context data of one or more documents in one or more network data repositories of a computer network to determine category classification and/or confidentiality classification for each of the one or more documents;

receiving a request from a user to access one of the one or more documents stored in one of the one or more network data repositories, the request including content or context data of the document;

identifying a confidentiality classification of the document in response to the machine learning;

determining a security access control level of the user based on lightweight directory access protocol (LDAP) extraction; and detecting a data security anomaly if the security access control level of the user is lower than the confidentiality classification of the document.

11. A method for content and context aware data classification, the method comprising:

identifying an unstructured document in a network data repository of a computer network;

scanning content data and metadata of the unstructured document;

extracting content features and context features of the unstructured document based on the content data and metadata;

vectorizing the content features and the context features of the unstructured document into one or more bag-of-words (BOW) representations;

converting the one or more BOW representations into term frequency-inverse document frequency (TF-IDF) vectors;

by Latent Semantic Indexing (LSI), transforming the TF-IDF vectors to LSI vectors to reduce dimensionality; and predicting one or more category classifications for the document by machine learning the extracted content features and context features of the unstructured document at a file management platform of the computer network in response to the LSI vectors, wherein each of the category classifications is associated with one or more confidentiality classifications; and storing the content features, the context features, the one or more BOW representations and the one or more LSI vectors of the unstructured document into a plurality of interlinked tables at the file management platform of the computer network, wherein the step of storing the content features, the context features, the BOW representations and the LSI vectors comprises:

storing the metadata of the unstructured document into a first table, the metadata including file paths, file sizes, file extensions, file owners, predicted category classifications and confidentiality classifications predicted by the machine learning, and/or validated category classifications and confidentiality classifications validated by the file owner, wherein each row of the first table corresponds to a file path of each of the one or more documents;

storing the metadata of the unstructured document into a second table, wherein the second table supplements the first table, and wherein each row of the second table corresponds to a concatenated data of a file owner with a hashed file path of each of the one or more documents owned by the file owner; and/or storing the content features of the unstructured document into a third table.

12. A machine learning engine for content and context aware data classification, the machine learning engine comprising:

a model training module configured to:

predict one or more clustering models based on machine learning latent semantic indexing (LSI) vectors of documents in a raw training set, each clustering model clustering one or more of the LSI vectors into a number of category classifications, each of the category classifications being associated with one or more confidentiality classifications, and select a clustering model from the one or more clustering models based on a confirmation of its corresponding category classifications by an administrator of a computer network;

a model evaluation module configured to evaluate the selected clustering model by applying the selected clustering model to cluster the documents in the raw test training set; and a data classification engine configured to:

if the evaluation of the selected clustering model produces same category classifications as labels of a raw test set, classify all of the documents into the number of category classifications using the selected clustering model and store content features, context features, one or more bag-of-words (BOW) representations and the one or more LSI vectors of the documents into a plurality of interlinked tables in a database, and if the evaluation of the selected clustering model produces different category classifications from the labels of the raw test set, indicate to the feature clustering module to select another clustering model from the one or more clustering models, wherein the data classification engine being configured to store the content features, the context features, the BOW representations and the LSI vectors comprises:

the data classification engine being configured to store metadata of the documents into a first table, the metadata including file paths, file sizes, file extensions, file owners, predicted category classifications and confidentiality classifications predicted by the machine learning, and/or validated category classifications and confidentiality classifications validated by the file owner, wherein each row of the first table corresponds to a file path of each of the documents;

the data classification engine being configured to store the metadata of the documents into a second table, wherein the second table supplements the first table, and wherein each row of the second table corresponds to a concatenated data of a file owner with a hashed file path of each of the documents owned by the file owner; and/or the data classification engine being configured to store the content features of the documents into a third table.

13. A file management platform system for content and context aware data classification, the file management platform system comprising:

a feature engineering module configured to:

split one or more documents in one or more network data repositories of a computer network into a labeled set and an unlabeled set, wherein the labeled set is randomly split into a raw labeled training set and a raw test set based on a predetermined ratio, wherein the unlabeled set is merged with the raw labelled training set to form a raw training set, extract the content features and context features of the documents in the raw training set, vectorize the content features and the context features of the documents in the raw training set into one or more bag-of-words (BOW) representations, convert the one or more BOW representations of the documents in the raw training set respectively into one or more term frequency-inverse document frequency (TF-IDF) vectors, and project the one or more TF-IDF vectors of the documents in the raw training set into a latent semantic indexing (LSI) space based on a desired level of retained variance to transform the one or more TF-IDF vectors to one or more LSI vectors; and a machine learning engine comprising:
a model training module configured to:
predict one or more clustering models based on machine learning the one or more LSI vectors of the documents in the raw training set, each clustering model clustering the one or more LSI vectors into a number of category classifications, each of the category classifications being associated with one or more confidentiality classifications, and
select a clustering model from the one or more clustering models based on a confirmation of its corresponding category classifications by an administrator of the computer network
a model evaluation module configured to evaluate the selected clustering model by applying the selected clustering model to cluster the documents in the raw test set; and
a data classification engine configured to:
if the evaluation of the selected clustering model produces same category classifications as the labels of the raw test set, classify all of the one or more documents into the number of category classifications using the selected clustering model and store the content features, the context features, the one or more BOW representations and the one or more LSI vectors of the one or more documents into a plurality of interlinked tables in the file management platform system, and
if the evaluation of the selected clustering model produces different category classifications from the labels of the raw test set, indicate to the feature clustering module to select another clustering model from the one or more clustering models wherein the data classification engine being configured to store the content features, the context features, the BOW representations and the LSI vectors comprises:
the data classification engine being configured to store metadata of the one or more documents into a first table, the metadata including file paths, file sizes, file extensions, file owners, predicted category classifications and confidentiality classifications predicted by the machine learning, and/or validated category classifications and confidentiality classifications validated by the file owner, wherein each row of the first table corresponds to a file path of each of the one or more documents;
the data classification engine being configured to store the metadata of the one or more documents into a second table, wherein the second table supplements the first table, and wherein each row of the second table corresponds to a concatenated data of a file owner with a hashed file path of each of the one or more documents owned by the file owner; and/or
the data classification engine being configured to store the content features of the one or more documents into a third table.

* * * * *